(12) United States Patent
Jackson et al.

(10) Patent No.: US 6,487,651 B1
(45) Date of Patent: Nov. 26, 2002

(54) MIMD ARRANGEMENT OF SIMD MACHINES

(75) Inventors: James H. Jackson, Cary, NC (US); Michael W. Kleeman, Sudbury, MA (US); Georges Melhem, Salem, NH (US); Sanjeev Mohindra, Andover, MA (US)

(73) Assignee: Assabet Ventures, Maynard, MA (US)

( * ) Notice: Subject to any disclaimer, the term of this patent is extended or adjusted under 35 U.S.C. 154(b) by 0 days.

(21) Appl. No.: 09/696,078

(22) Filed: Oct. 25, 2000

Related U.S. Application Data

(60) Provisional application No. 60/161,587, filed on Oct. 26, 1999.

(51) Int. Cl.[7] ............ G06F 15/16; G06F 15/80
(52) U.S. Cl. ............................. 712/13; 712/20
(58) Field of Search ............... 712/13, 20, 15, 712/21, 22, 229

(56) References Cited

U.S. PATENT DOCUMENTS

| | | | |
|---|---|---|---|
| 4,229,790 A | * 10/1980 | Gilliland ............... | 709/101 |
| 4,270,169 A | 5/1981 | Hunt et al. ............ | 364/200 |
| 4,270,170 A | 5/1981 | Reddaway ............. | 364/200 |
| 4,621,339 A | 11/1986 | Wagner et al. ........ | 364/900 |
| 4,720,780 A | 1/1988 | Dolecek ............... | 364/200 |
| 4,727,503 A | 2/1988 | McWhinter ........... | 364/715 |
| 4,985,832 A | 1/1991 | Grondalski ........... | 364/200 |
| 4,992,933 A | 2/1991 | Taylor ................. | 364/200 |
| 5,038,386 A | 8/1991 | Li ........................ | 382/49 |
| 5,133,073 A | 7/1992 | Jackson et al. ........ | 395/800 |
| 5,157,785 A | 10/1992 | Jackson et al. ........ | 395/800 |
| 5,165,023 A | 11/1992 | Gifford ................. | 395/325 |
| 5,179,714 A | 1/1993 | Graybill ............... | 395/800 |
| 5,193,202 A | 3/1993 | Jackson et al. ........ | 395/800 |
| 5,212,777 A | 5/1993 | Gove et al. ............ | 395/375 |
| 5,239,654 A | 8/1993 | Ing-Simmons et al. .. | 395/800 |
| 5,253,308 A | 10/1993 | Johnson ............... | 382/49 |

(List continued on next page.)

OTHER PUBLICATIONS

A Reconfigurable Processor Array with Routing ISIs and General Purpose DSPs: Jacob Levison, et al; pp. 102–116, IEEE 1992.
A Single–Chip, 1.6 Billion, 16–b MAC/s Multiprocessor DSP; B. Ackland, et al.; pp. 412–424; *IEEE Journal of Solid–State circuits;* vol. 33 No. 3; Mar. 2000.
A 450–MHz RISC Microprocessor with Enhanced Instruction Set and Copper Connect; Carmine Nicoletta; et al; pp. 1478–1491; *IEEE Journal of Solid–State Circuits;* vol. 34 No. 11; Nov. 1999.

*Primary Examiner*—Eric Coleman
(74) *Attorney, Agent, or Firm*—Weingarten, Schurgin, Gagnebin & Lebovici LLP

(57) ABSTRACT

An SIMD array processor having a scalable and flexible architecture. The SIMD array architecture includes an array of processing elements, a plurality of processor controllers, and at least one other computer system. A system area network interconnects at least one user computer with the processor controllers and the computer system; and, a storage area network interconnects at least one storage device with the processor controllers and the computer system. The SIMD array architecture is adapted to allow different user computers to use different portions of the array of processing elements and/or different processor controllers and computer systems simultaneously. The array of processing elements has a hierarchical structure comprising backplanes, PCB's, ASIC's, and arrays of processing elements. The SIMD array architecture can be scaled by increasing the quantity of backplanes, PCB's, ASIC's, and/or by increasing the size of the arrays of processing elements. The SIMD array architecture can also be flexibly modified to achieve arrays of processing elements with different aspect ratios by selectively accessing data paths interconnecting the processing elements.

2 Claims, 2 Drawing Sheets

U.S. PATENT DOCUMENTS

| | | | |
|---|---|---|---|
| 5,371,896 A | 12/1994 | Gove et al. | 395/800 |
| 5,410,727 A | 4/1995 | Jaffe et al. | 395/800 |
| 5,450,604 A | 9/1995 | Davies | 395/800 |
| 5,452,291 A * | 9/1995 | Eisenhandler | 370/54 |
| 5,457,789 A * | 10/1995 | Dietrich, Jr. et al. | 395/427 |
| 5,471,627 A | 11/1995 | Means et al. | 395/800 |
| 5,535,410 A * | 7/1996 | Watanabe et al. | 395/800 |
| 5,577,262 A * | 11/1996 | Pechanek et al. | 395/890 |
| 5,581,773 A * | 12/1996 | Glover | 395/800 |
| 5,588,152 A * | 12/1996 | Dapp et al. | 395/800 |
| 5,590,356 A * | 12/1996 | Gilbert | 395/800 |
| 5,630,162 A | 5/1997 | Wilkinson et al. | 395/800 |
| 5,673,396 A | 9/1997 | Smolansky et al. | 395/250 |
| 5,717,943 A * | 2/1998 | Barker | 712/20 |
| 5,752,068 A * | 5/1998 | Gilbert | 395/800.16 |
| 5,761,523 A * | 6/1998 | Wilkinson | 712/20 |
| 5,809,292 A | 9/1998 | Wilkinson et al. | 395/563 |
| 5,822,608 A * | 10/1998 | Dieffenderfer | 712/20 |
| 5,842,031 A * | 11/1998 | Barker et al. | 395/800 |
| 5,892,962 A | 4/1999 | Cloutier | 395/800.16 |
| 5,963,746 A * | 10/1999 | Barker et al. | 395/800.2 |
| 6,038,580 A * | 3/2000 | Yeh | 708/402 |
| 6,052,773 A * | 4/2000 | DeHon | 712/43 |
| 6,085,304 A * | 7/2000 | Morris et al. | 712/22 |

\* cited by examiner

MIMD ARRANGEMENT OF SIMD MACHINES

CROSS REFERENCE TO RELATED APPLICATIONS

This application claims priority of U.S. Provisional Patent Application No. 60/161,587 filed Oct. 26, 1999 entitled FINITE DIFFERENCE ACCELERATOR.

STATEMENT REGARDING FEDERALLY SPONSORED RESEARCH OR DEVELOPMENT

N/A

BACKGROUND OF THE INVENTION

The present invention relates generally to SIMD array processors, and more specifically to an SIMD array processor having a scalable and flexible architecture.

Single-Instruction Multiple-Data (SIMD) array processors are known which comprise multi-dimensional arrays of interconnected processing elements executing the same instruction simultaneously on a plurality of different data samples. For example, an SIMD array processor may include a two-dimensional array of processing elements in which each processing element is connected to its four (4) nearest neighbors to form a "North, East, West, South (NEWS) array". In such NEWS arrays, each processing element communicates directly with its North, East, West, and South neighbors. The exemplary SIMD array processor may be incorporated in a processing system that includes a user computer interfaced with a processor controller that converts a given command sequence provided by the user computer to a corresponding instruction and broadcasts the instruction to the array of processing elements. An example of such a multi-dimensional processing system is disclosed in U.S. Pat. No. 5,193,202.

SIMD array processors can be used to solve a set of partial differential equations with associated boundary conditions that describe the nature of a physical environment over a finite volume of space. For example, a particular set of partial differential equations and boundary conditions may be approximated by a corresponding set of finite difference equations that describe values of dependent variables at a finite number of points or "nodes" distributed within a problem space. Further, after assigning a single processing element to each node and arranging the processing elements in the array so that each one can efficiently communicate with its nearest neighbors, the SIMD array processor can be used to calculate in parallel the dependent variable values at the finite number of nodes within the problem space.

One drawback of using SIMD array processors to solve such sets of finite difference equations is that the actual number of processing elements included in the SIMD array processor is often significantly less than the number of nodes required to solve the set finite difference equations. The above-mentioned multi-dimensional processing system of U.S. Pat. No. 5,193,202 addresses this problem by providing a virtual processing address and instruction generator that enables each processing element of an SIMD array processor to handle the processing for more than one node in a problem space.

Nevertheless, it would be desirable to have an SIMD array processor with an architecture that can be easily scaled to include increasing numbers of active processing elements. Such an architecture for an SIMD array processor would not only be scalable but also flexible to facilitate mapping of a node mesh onto the array of processing elements.

BRIEF SUMMARY OF THE INVENTION

In accordance with the present invention, a scalable and flexible architecture for an SIMD array processor is provided that includes an array of processing elements, at least one processor controller coupled to the array of processing elements, a system area network for interconnecting at least one user computer and the processor controllers, and a storage area network for interconnecting at least one storage device and the processor controllers. In one embodiment, the processor controllers are part of a device cluster. In a preferred embodiment, the system area network further interconnects at least one user computer and at least one computer that is not coupled to an array of processing elements. One or more user computers can communicate with the processor controllers coupled to the array of processing elements and the computers not coupled to an array to use different portions of the array and/or different processor controllers and computers to solve different problems simultaneously.

The array of processing elements preferably has a hierarchical structure comprising backplanes, printed circuit boards, application specific integrated circuits, and arrays of processing elements. The SIMD array architecture can be scaled by increasing the quantity of backplanes, printed circuit boards, application specific integrated circuits, and/or by increasing the size of the arrays of processing elements. Moreover, the SIMD array architecture can be flexibly modified to achieve arrays of processing elements with different aspect ratios by selectively accessing data paths interconnecting the processing elements.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

The entire disclosure of U.S. Provisional Patent Application No. 60/161,587 filed Oct. 26, 1999 is incorporated herein by reference.

Figure 1:
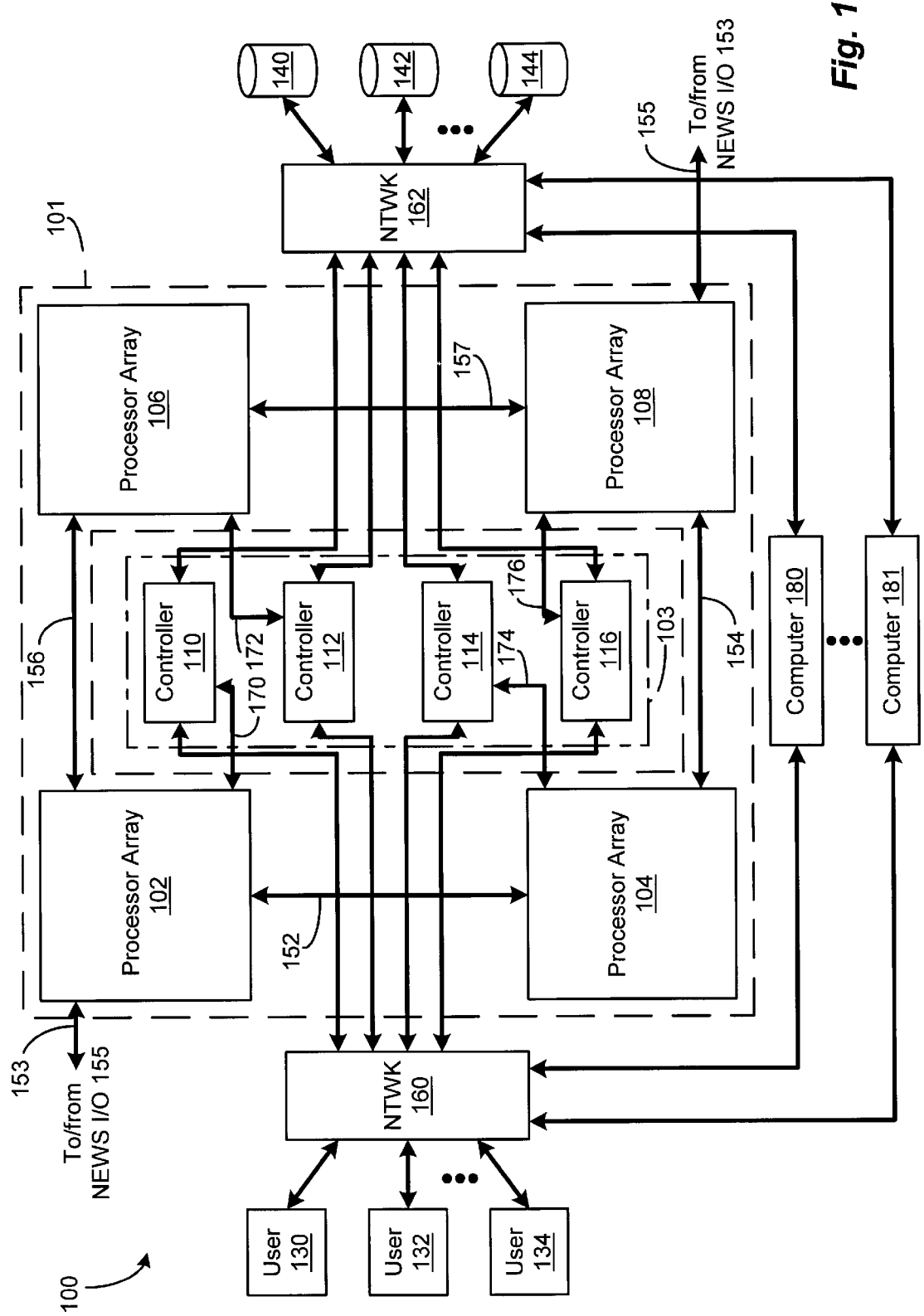
FIG. 1 is a block diagram depicting an architecture for a MIMD cluster of SIMD array processors and processors without arrays in accordance with the present invention.

FIG. 1 is a block diagram depicting an illustrative embodiment of an architecture 100 for a Multiple-Instruction Multiple-Data (MIMD) cluster of Single-Instruction Multiple-Data (SIMD) array processors and processors without arrays in accordance with the present invention. The SIMD array architecture 100 comprises a NEWS array 101, which includes a plurality of processor arrays 102, 104, 106, and 108. In a preferred embodiment, each of the processor arrays 102, 104, 106, and 108 includes a backplane for electrically coupling a plurality of Printed Circuit Boards (PCB's). Further, each PCB preferably has a plurality of Application Specific Integrated Circuits (ASIC's) mounted thereto, and each ASIC preferably includes a two-dimensional NEWS array of Processing Elements (PE's). A plurality of NEWS Input/Output (I/O) data paths 152 through 157 interconnects the processor arrays 102, 104, 106, and 108 in the NEWS array configuration. Although FIG. 1 depicts the SIMD array architecture 100 with the processor arrays 102, 104, 106, and 108 that include two-dimensional NEWS arrays of PE's, it should be understood that the SIMD array architecture 100 may alternatively include an array of PE's interconnected by any suitable communication network.

It is noted that the SIMD array architecture 100 can be scaled, e.g., by increasing the number of backplanes, by increasing the number of PCB's coupled to each backplane, by increasing the number of ASIC's mounted on each PCB, and/or by increasing the size of the array of PE's included in each ASIC. In a preferred embodiment, each backplane is adapted to interconnect with sixteen (16) PCB's, each PCB includes sixteen (16) ASIC's, and each ASIC includes an 8×8 NEWS array of PE's.

It is also noted that the aspect ratio of the NEWS array 101 may be conceptually changed. For example, processor controllers 110, 112, 114, and 116 may send instruction sequences to the processor arrays 102, 104, 106, and 108, respectively, directing the processor arrays to ignore any data provided on the NEWS I/O's 153 and 155 while using the data provided on the NEWS I/O's 152, 154, 156, and 157. In this way, the NEWS array 101 can be conceptually configured as a "square" NEWS array (aspect ratio 1:1) comprising the processor arrays 102, 104, 106, and 108. As an alternative example, the processor controllers 110, 112, 114, and 116 may send instruction sequences that direct the processor arrays to ignore any data provided on the NEWS I/O's 152 and 157 while using the data provided on the NEWS I/O's 153, 154, 155, and 156. In this way, the NEWS array 101 can be conceptually configured as a "rectangular" NEWS array (aspect ratio 4:1). In a preferred embodiment, the above-mentioned square NEWS array comprises a 256× 256 NEWS array of PE's, and the above-mentioned rectangular NEWS array comprises a 512×128 NEWS array of PE's.

The SIMD array architecture 100 includes a system area network 160 that interconnects a plurality of user computers, e.g., user computers 130, 132, and 134, and the plurality of processor controllers 110, 112, 114, and 116. In one embodiment, the plurality of processor controllers 110, 112, 114, and 116 is part of a device cluster 103. The SIMD array architecture 100 further includes a storage area network 162 that interconnects the processor controllers 110, 112, 114, and 116 and a plurality of mass storage devices, e.g., mass storage devices 140, 142, and 144.

Each of the user computers 130, 132, and 134 comprises a computer or workstation operating under control of a standard operating system such as WINDOWS NT™, LINUX™, SOLARIS™, or any other suitable operating system. For example, each of the user computers 130, 132, and 134 may include a C++ compiler and a preprocessor for the C++ compiler that allow the user computer to compile and execute programs written using, e.g., parallel processing extensions to the C++ programming language.

Similarly, each of the processor controllers 110, 112, 114, and 116 comprises a computer or workstation operating under control of any suitable operating system. For example, each of the processor controllers 110, 112, 114, and 116 may include at least one sequential processor executing a program stored in memory that provides intermediary processing functions between the user computers 130, 132, and 134 and the processor arrays 102, 104, 106, and 108. In the illustrated embodiment, it should be understood that the user computers 130, 132, and 134 may provide functions normally provided by the processor controllers 110, 112, 114, and 116; and, that the processor controllers 110, 112, 114, and 116 may provide functions normally provided by the user computers 130, 132, and 134.

Each of the user computers 130, 132, and 134 communicates with one or more of the processor controllers 110, 112, 114, and 116 by way of the system area network 160 to send commands and/or data to the processor controllers and read data provided by the processor controllers in response thereto. For example, each of the processor controllers 110, 112, 114, and 116 may identify such commands; translate the commands to a sequence of instructions for performing, e.g., parallel arithmetic and/or data movement operations suitable for execution by a corresponding processor array; and, send the sequence of instructions to the corresponding processor array. Specifically, the processor controller 110 sends such an instruction sequence and/or data to the processor array 102 via a bus 170, the processor controller 112 sends such an instruction sequence and/or data to the processor array 106 via a bus 172, the processor controller 114 sends such an instruction sequence and/or data to the processor array 104 via a bus 174, and the processor controller 116 sends such an instruction sequence to the processor array 108 via a bus 176. In the illustrated embodiment, it should be understood that each of the processor controllers 110, 112, 114, and 116 may execute instruction sequences that are more efficiently executed by a sequential processor than the NEWS array 101.

In a preferred embodiment, the SIMD array architecture 100 further includes at least one computer such as computers 180 and 181, which comprise computers or workstations with at least one sequential processor operating under control of any suitable operating system. Like the processor controllers 110, 112, 114, and 116, the computers 180 and 181 may execute instruction sequences that are more efficiently executed by sequential processors than the NEWS array 101. In the illustrated embodiment, the computers 180 and 181 are coupled to the system area network 160 and the storage area network 162. Accordingly, the system area network 160 further interconnects the plurality of user computers 130, 132, and 134 and the computers 180 and 181; and, the storage area network 162 further interconnects the computers 180 and 181 and the plurality of mass storage devices 140, 142, and 144.

At least one of the processor controllers 110, 112, 114, and 116 or the computers 180 and 181 provides functions for scheduling operations performed by the processor controllers 110, 112, 114, and 116, the computers 180 and 181, and the processor arrays 102, 104, 106, and 108; and, functions for managing these processing resources. Accordingly, the system area network 160 not only allows the processor controllers 110, 112, 114, and 116 and the computers 180 and 181 to communicate with the user computers 130, 132, and 134, but also allows the processor controllers 110, 112, 114, and 116 and the computers 180 and 181 to communicate with each other. In a preferred embodiment, one of the computers 180 and 181 provides these scheduling and managing functions for optimal load balancing. In an alternative embodiment, one of the user computers 130, 132, and 134 provides such scheduling and managing functions.

The system area network 160 supports conventional protocols and communication interfaces such as the Internet Protocol (IP) over Ethernet, IP over Fibre Channel (FC), or any other suitable protocol and communication interface. In an alternative embodiment, the system area network 160 supports a Virtual Interface (VI) that communicably couples the local network with at least one remote device such as a switch.

Each of the processor controllers 110, 112, 114, and 116 and the computers 180 and 181 communicates with one or more of the mass storage devices 140, 142, and 144 by way of the storage area network 162 to store results of data processing operations. For example, the processor controller 110 may store results of operations executed by the processor array 102 in at least one of the mass storage devices 140, 142, and 144. Similarly, the processor controllers 112, 114, and 116 may store results of operations executed by the processor arrays 106, 104, and 108, respectively, in the mass storage devices 140, 142, and 144. It is noted that a mass storage medium may alternatively be included in at least one of the processor controllers 110, 112, 114, and 116 or the computers 180 and 181. In this alternative embodiment, the storage area network 162 and the mass storage devices 140, 142, and 144 may be omitted from the SIMD array architecture 100.

The storage area network 162 supports any suitable protocol and communication interface such as the Small Computer System Interface (SCSI) protocol over FC. Like the system area network 160, the storage area network 162 supports a VI in an alternative embodiment. Moreover, the mass storage devices 140, 142, and 144 may be magnetic tapes/disks, optical disks, Redundant Arrays of Inexpensive Disks (RAID), or any other suitable mass storage media.

As mentioned above, the SIMD array architecture 100 can be scaled by increasing the number and/or size of the processor arrays 102, 104, 106, and 108. It should be noted that the number of processor controllers 110, 112, 114, and 116 can also be scaled in conjunction with the processor arrays of the NEWS array 101. Further, the system area network 160 and the storage area network 162 can be scaled to connect to increasing numbers of user computers, mass storage devices, processor controllers, and any other computerized devices such as the computers 180 and 181.

Figure 2:
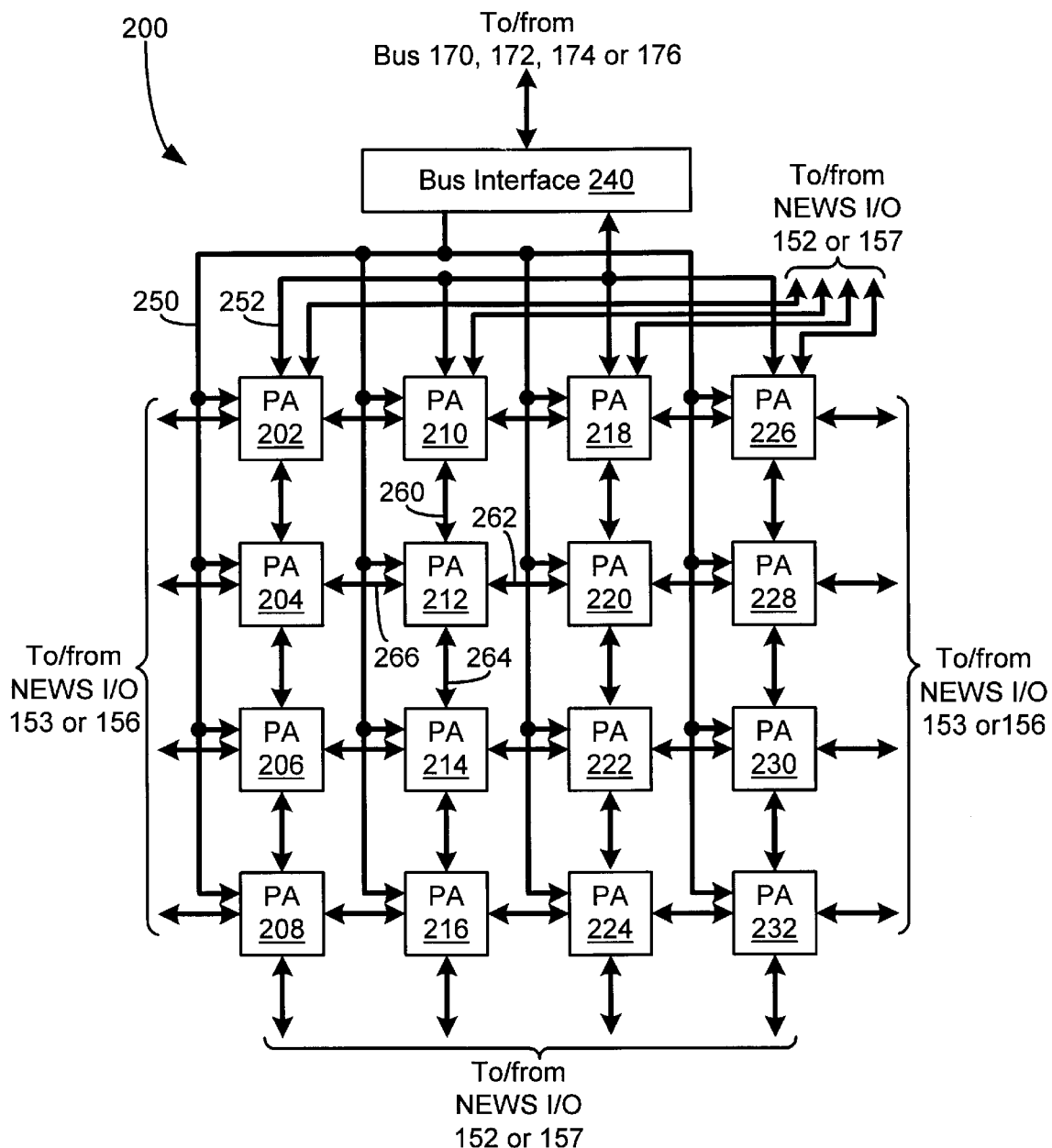
FIG. 2 is a block diagram of a processor array included in each SIMD array of the MIMD cluster architecture of FIG. 1.

FIG. 2 is a block diagram depicting an exemplary processor array 200 included in the SIMD array architecture 100 (see FIG. 1). In a preferred embodiment, each of the processor arrays 102, 104, 106, and 108 is like the processor array 200 depicted in FIG. 2.

As described above, the processor array 102 preferably includes a plurality of PCB's communicably coupled by way of a backplane, and each PCB preferably has a plurality of ASIC's including two-dimensional NEWS arrays of PE's mounted thereto. Accordingly, Processor Arrays (PA's) 202 through 232, as depicted in FIG. 2, preferably include a plurality of such PCB's configured as a two-dimensional NEWS array.

It should be understood that each of the PA's 202 through 232 may alternatively include an array of PE's or a single PE. Further, although FIG. 2 depicts the processor array 200 as including the two-dimensional NEWS array of PA's 202 through 232, it should be noted that the processor array 200 may alternatively include an array of PA's with any other suitable communication structure. FIG. 2 depicts the processor array 200 as comprising a 4×4 NEWS array of the PA's 202 through 232 for purposes of illustration.

A plurality of NEWS I/O's interconnects each of the PA's 202 through 232 and its nearest neighboring PA's. For example, for the PA 212, a "North" I/O 260 interconnects the PA 212 and the PA 210; an "East" I/O 262 interconnects the PA 212 and the PA 220; a "West" I/O 266 interconnects the PA 212 and the PA 204; and, a "South" I/O 264 interconnects the PA 212 and the PA 214. Moreover, the PA's 202 through 208 that are conceptually located along a West edge of the NEWS array include suitable West I/O's for coupling these PA's to the NEWS I/O 153 or 156 (see FIG. 1); the PA's 226 through 232 conceptually located along an East edge of the NEWS array include suitable East I/O's for coupling these PA's to the NEWS I/O 153 or 156 (see FIG. 1); the PA's 202, 210, 218, and 226 conceptually located along a North edge of the NEWS array include suitable North I/O's for coupling these PA's to the NEWS I/O 152 or 157 (see FIG. 1); and, the PA's 208, 216, 224, and 232 comprise suitable South I/O's for coupling these PA's to the NEWS I/O 152 or 157 (see FIG. 1).

As also described above, the processor controllers 110, 112, 114, and 116 send sequences of instructions to the processor arrays 102, 106, 104, and 108, respectively, via the respective buses 170, 172, 174, and 176 (see FIG. 1). Specifically, the processor controller 110, 112, 114, or 116 sends such sequences of instructions to a bus interface 240 (see FIG. 2) and controls the bus interface 240 to broadcast the instruction sequences to the exemplary PA's 202 through 232 by way of a command bus 250 (see FIG. 2). Similarly, the processor controllers 110, 112, 114, and 116 send (receive) data to (from) the processor arrays 102, 106, 104, and 108, respectively, via the respective buses 170, 172, 174, and 176. Specifically, the processor controller 110, 112, 114, or 116 sends (receives) data to (from) the bus interface 240 and controls the bus interface 240 to send (receive) the data to (from) the exemplary PA's 202 through 232 by way of a bi-directional edge I/O bus 252 (see FIG. 2).

It is noted that the system area network 160 (see FIG. 1) preferably transfers data between the user computers 130, 132, and 134 and the processor controllers 110, 112, 114, and 116 at a relatively high data rate, e.g., 100 MB/s. Because data is also transferred between the processor controller 110, 112, 114, or 116 and the exemplary PA's 202 through 232 via the bus interface 240 and the edge I/O bus 252, both the bus interface 240 and the bi-directional edge I/O bus 252 are preferably capable of transferring data at this relatively high data rate.

In a preferred embodiment, the bus interface 240 includes circuitry for generating a clock signal used by both the backplane and the command bus 250 of the NEWS array 101. Further, each ASIC mounted to the PA's 202 through 232 preferably includes circuitry for generating respective clock signals used by the PE's and private memory incorporated therein. The backplane clock speed is preferably one-fourth of the memory clock speed; and, the memory clock speed is preferably one-half of the PE clock speed.

Because the SIMD array architecture 100 includes the NEWS array 101 and the device cluster 103, as depicted in FIG. 1, the architecture 100 has characteristics of both a standard SIMD array architecture and a standard MIMD cluster system architecture. For example, the user computers 130, 132, and 134 may communicate with the processor controllers 110, 112, 114, and 116 and the computers 180 and 181 as in the standard MIMD cluster system architecture, e.g., to execute different instructions on a plurality of different data samples simultaneously using the processor controllers 110, 112, 114, and 116 and the computers 180 and 181. Further, the processor controllers 110, 112, 114, and 116 may communicate with the processor arrays 102, 104, 106, and 108 as in the standard SIMD array architecture, e.g., to execute the same instructions on a plurality of different data samples simultaneously using the processor arrays 102, 104, 106, and 108. Because commands sent by the user computers 130, 132, and 134 can be translated by the processor controllers 110, 112, 114, and 116 to instructions subsequently executed by the processor arrays 102, 104, 106, and 108, the user computers 130, 132, and 134 can communicate with the processor controllers 110, 112, 114, and 116 as in the standard MIMD cluster system architecture while obtaining efficiencies derived from parallel processing using the SIMD processor arrays 102, 104, 106, and 108. Moreover, the user computers 130, 132, and 134 can communicate with the processor controllers 110, 112, 114, and 116 and the computers 180 and 181 to use different portions of the processor arrays 102, 104, 106, and 108 and/or different processor controllers and computers to solve different problems simultaneously.

The embodiments disclosed herein will be better understood with reference to the following illustrative examples. In a first illustrative example, the user computer 130 sends a command via the system area network 160 to the processor controller 110, which functions as a master computer for scheduling and managing processing resources. Next, the processor controller 110 translates the command to a sequence of instructions. In this first illustrative example, the processor controller 110 can determine whether the instruction sequence would be more efficiently executed using the processor controllers 110, 112, 114, and 116, the computers 180 and 181, or the processor arrays 102, 104, 106, and 108. For example, the processor controller 110 may make such a determination by reading information coded in the instruction sequence.

In the event that the processor controller 110 determines that the instruction sequence would be more efficiently executed by at least one sequential processor, the processor controller 110 schedules the instruction sequence to be executed by at least one of the processor controllers 110, 112, 114, and 116 and/or the computers 180 and 181.

In the event that the processor controller 110 determines that the instruction sequence would be more efficiently executed by at least one parallel processor array, the processor controller 110 schedules the instruction sequence to be executed by at least one of the processor arrays 102, 104, 106, and 108.

In the event that the processor controller 110 determines that the instruction sequence would be more efficiently executed by executing a first portion of the instruction sequence using at least one sequential processor and a second portion using at least one parallel processor array, the processor controller 110 schedules the first and second portions of the instruction sequence to be executed by at least one of the processor controllers 110, 112, 114, and 116 and/or the computers 180 and 181, and at least one of the processor arrays 102, 104, 106, and 108, respectively.

In the event that the processor controller 110 determines that the instruction sequence would be more efficiently executed using all of the processor controllers 110, 112, 114, and 116 and the computers 180 and 181, and/or all of the processor arrays 102, 104, 106, and 108, simultaneously, then the processor controller 110 schedules the instruction sequence to be so executed while locking out any subsequent commands.

While the processor controllers 110, 112, 114, and 116, the computers 180 and 181, and/or the processor arrays 102, 104, 106, and 108 execute the instruction sequence, the processor controller 110 schedules at least one of the processor controllers 110, 112, 114, and 116 and the computers 180 and 181 to retrieve any required data from at least one of the mass storage devices 140, 142, and 144 via the storage area network 162. Finally, at the completion of the instruction sequence execution, the processor controller 110 schedules at least one of the processor controllers 110, 112, 114, and 116 and the computers 180 and 181 to store data results in at least one of the mass storage devices 140, 142, and 144 via the storage area network 162.

In this first illustrative example, it is noted that more than one of the user computers 130, 132, and 134 may send commands via the system area network 160 to the processor controller 110 for efficiently executing respective instruction sequences on different processor arrays, processor controllers, and/or other computers such as the computers 180 and 181, simultaneously.

In a second illustrative example, a set of partial differential equations and boundary conditions are approximated by a corresponding set of finite difference equations that describe values of dependent variables at a finite number of nodes distributed within a volume of space. As in the first illustrative example, the user computer 130 sends a command via the system area network 160 to the processor controller 110, which provides functions for scheduling and managing resources; and, the processor controller 110 translates the command to an instruction sequence for solving the set of finite difference equations.

In the second example, a multi-dimensional node mesh defines locations of the nodes in the problem space. Moreover, the processor controller 110 can determine the dimensions of the node mesh, and modify the conceptual configuration of the NEWS array 101 to obtain a NEWS array having an aspect ratio that conforms to the node mesh dimensions. For example, the processor controller 110 may make such a determination of node mesh dimensions by reading information coded in the instruction sequence.

In the event that the processor controller 110 determines that no node mesh dimension is longer than any of the other dimensions of the node mesh, the processor controller 110 directs the processor arrays to ignore any data provided on the NEWS I/O's 153 and 155 while using the data provided on the NEWS I/O's 152, 154, 156, and 157 for conceptually obtaining a square NEWS array of PE's; and, schedules the instruction sequence to be executed by the processor arrays 102, 104, 106, and 108 comprising the square NEWS array of PE's.

In the event that the processor controller 110 determines that one node mesh dimension is longer than the other dimensions of the node mesh, the processor controller 110 directs the processor arrays to ignore any data provided on the NEWS I/O's 152 and 157 while using the data provided on the NEWS I/O's 154, 155, 153, and 156 for conceptually obtaining a rectangular NEWS array of PE's; and, schedules the instruction sequence to be executed by the processor arrays 102, 104, 106, and 108 comprising the rectangular NEWS array of PE's.

In an alternative embodiment, additional NEWS I/O data paths may be provided, e.g., between the East I/O of the PA 232 and the West I/O of the PA 206, between the East I/O of the PA 230 and the West I/O of the PA 204, and between the East I/O of the PA 228 and the West I/O of the PA 202 (see FIG. 2) to provide increased flexibility in conceptually changing the aspect ratio of the NEWS array of PE's. Such additional NEWS I/O data paths may also be provided in the processor arrays 104, 106, and 108.

Those of ordinary skill in the art should further appreciate that variations to and modification of the above-described SIMD array architecture may be made without departing from the inventive concepts disclosed herein. Accordingly, the present invention should be viewed as limited solely by the scope and spirit of the appended claims.

What is claimed is:

1. A method of operating a computing system, the computing system comprising an array of processing elements and a plurality of processor controllers, at least one of the plurality of processor controllers having an interface to a communications link, and at least one of the plurality of processor controllers being adapted to control the plurality of processor controllers and at least a portion of the array of processing elements, the method comprising the steps of:

receiving at least one command at the interface of a first processor controller;

translating the command to an instruction sequence by the first processor controller;

in the event it is determined by the first processor controller that a first portion of the instruction sequence is executable in a SIMD mode by the array of processing elements, providing the first portion of the instruction sequence to at least a portion of the array of processing elements by the first processor controller, and executing the first portion of the instruction sequence by the array of processing elements; and in the event it is determined by the first processor controller that a second portion of the instruction sequence is executable in a MIMD mode by at least one of the plurality of processor controllers, providing the second portion of the instruction sequence to at least one of the plurality of processor controllers by the first processor controller, and executing the second portion of the instruction sequence by the at least one of the processor controllers.

2. The method of claim 1 wherein the first executing step and the second executing step are performed concurrently.

* * * * *